United States Patent
Kim et al.

(10) Patent No.: US 6,819,075 B2
(45) Date of Patent: Nov. 16, 2004

(54) VOLTAGE-CONTROLLED STARTING RELAY FOR INDUCTION MOTOR

(76) Inventors: In-Seok Kim, No. 1901, Seocho Dongah Tower, 1321-10, Seocho-dong, Seocho-gu, Seoul, 137-857 (KR); Young-Jun Kim, No. 1901, Seocho Dongah Tower, 1321-10, Seocho-dong, Seocho-gu, Seoul, 137-857 (KR)

( * ) Notice: Subject to any disclaimer, the term of this patent is extended or adjusted under 35 U.S.C. 154(b) by 63 days.

(21) Appl. No.: 10/265,172

(22) Filed: Oct. 4, 2002

(65) Prior Publication Data

US 2003/0107343 A1 Jun. 12, 2003

(30) Foreign Application Priority Data

Nov. 27, 2001 (KR) .................................... 2001-0074189

(51) Int. Cl.[7] ................................................ H02P 1/42
(52) U.S. Cl. ...................................... 318/778; 318/781
(58) Field of Search ................................ 318/727, 778, 318/781, 785, 786

(56) References Cited

U.S. PATENT DOCUMENTS

| | | | | |
|---|---|---|---|---|
| 3,882,364 A | * | 5/1975 | Wright et al. ............. | 318/786 |
| 4,486,700 A | * | 12/1984 | Kawate et al. ............. | 318/781 |
| 4,605,888 A | * | 8/1986 | Kim ............................ | 318/786 |
| 4,782,278 A | * | 11/1988 | Bossi et al. ................ | 318/786 |
| 4,843,295 A | * | 6/1989 | Thompson et al. ........ | 318/786 |
| 4,967,131 A | * | 10/1990 | Kim ............................ | 318/786 |

* cited by examiner

*Primary Examiner*—Bentsu Ro
(74) *Attorney, Agent, or Firm*—F. Chau & Associates, LLC

(57) ABSTRACT

There is provided a voltage-controlled electronic relay for starting a single-phase induction motor, which includes: a power supply unit 310, configured of a bridge diode BD, for supplying power to circuit elements of the starting relay when AC power of the induction motor is turned on; a triac 306 for applying the AC power to a starting coil W3 of the induction motor or cutting off the AC power; a signal input unit 322 for sensing a voltage induced to the starting coil; a hysteresis unit 324 for outputting an ON control signal at the initial starting stage, generating an OFF control signal for turning off the switch when the induced voltage sensed by the sensing element reaches a predetermined OFF reference voltage, and generating the ON control signal for turning on the switch again when the induced voltage becomes lower than a predetermined ON reference voltage during a normal operation period; and a triggering unit 330 for turning on the switch according to the ON control signal of the hysteresis unit and turning off the switch according to the OFF control signal. Accordingly, impulse noise generated across the triac is removed using a spark killer and stabilized voltage is provided to the circuit elements.

10 Claims, 4 Drawing Sheets

US 6,819,075 B2

VOLTAGE-CONTROLLED STARTING RELAY FOR INDUCTION MOTOR

BACKGROUND OF THE INVENTION

1. Field of the Invention

The present invention generally relates to a single-phase induction motor and, more particularly, to a voltage-controlled electronic relay for starting a single-phase induction motor.

2. Description of the Related Art

Conventionally, a single-phase induction motor that is operated with single-phase AC power includes an operation coil and a starting coil. The starting coil becomes conductive only at the moment when the motor starts to provide a starting rotary power to the motor and is maintained in OFF state when the motor is in its normal operation state after started. A device for turning on/off the starting coil of the single-phase induction motor is called a centrifugal switch or starting relay. A voltage-controlled electronic relay employs the characteristic that the voltage induced across both ends of the starting coil increases as the speed of revolution of the motor is raised. That is, the voltage-controlled relay provides power to the starting coil at the initial stage where the induction motor is supplied with power, and then detects the voltage induced across the starting coil to cut off the power applied to the starting coil when the induced voltage becomes higher than a predetermined level (when the motor reaches its normal operation state). In case that a heavy load is applied to the motor during its normal operation so that the motor becomes a constraint state, the voltage induced across the starting coil is lowered. The relay senses this induced voltage and provides power to the starting coil when the voltage becomes lower than a predetermined level to start the motor again. Here, the induced voltage turning off the relay is relatively high and the induced voltage turning on the relay again is relatively low, the difference between the two voltages being called 'hysteresis width'.

A conventional voltage-controlled electronic relay for starting the single-phase induction motor includes the voltage-controlled electronic relay disclosed in Korean Pat. No. 91-2458 applied by the applicant. This voltage-controlled relay includes a single-phase induction motor 110, and an electronic relay circuit 120 for turning on/off the starting coil of the motor, as shown in FIG. 1.

Referring to FIG. 1, the single-phase induction motor 110 has operation coils W1 and W2 and the starting coil W3. The operation coils W1 and W2 are connected such that they directly receive commercial AC power (AC 110V) through power input ports L1 and L2 but the starting coil W3 accepts the power via a starting capacitor SC and the electronic relay 120.

The electronic relay 120 that is a switch for applying the power to the starting coil W3 through the starting capacitor SC is constructed of a triac 121 and a control circuit for triggering the gate of the triac 121. The control circuit includes a power supply unit 122 for supplying power to circuit elements of the relay, a control signal generator 123 for sensing the voltage across the starting coil W3 to generate an ON/OFF control signal, and a triggering unit 124 for triggering the gate of the triac 121 according to the output of the control signal generator 123.

The power supply unit 122 consists of a diode D2 for rectifying the AC power applied through connection ports T1 and T2, a filter capacitor C4 for filtering the output of the diode D2, distribution resistors R7 and R8, a zener diode ZD and a filter capacitor C2, to supply power Vcc to NAND gates M1, M2, M3 and M4.

The control signal generator 123 is constructed of a diode D1 and distribution resistors R1 and R2 for sensing the voltage across the starting coil W3, a resistor R3 for controlling the hysteresis width and two NAND gates M1 and M2, to sense the voltage induced across the starting coil W3 to generate the control signal for turning on/off the triac 121. The triggering unit 124 includes NAND gates M3 and M4 for creating oscillation according to the control signal and a transistor TR for interrupting a pick-up coil PC, the pick-up coil PC triggering the gate of the triac 121. Here, the output of the NAND gate M2 is positively fed back to the NAND gate M1 through the resistor R4 to widen the hysteresis width and the capacitor C3 and resistor R5 negatively feeds back the output of the NAND gate M4 to create oscillation. In FIG. 1, reference symbols R4 and R9 designate current-limiting resistors and C1 represents a filter capacitor.

When the AC power is applied to the induction motor 110 having the aforementioned configuration, the power Vcc is supplied to the circuit elements through the power supply unit 122 to operate the electronic relay 120. The voltage induced across the starting coil W3 is applied to the NAND gate M1 through the diode D1 connected to the connection port T3, the distribution resistors R1 and R2 and the hysteresis width controlling resistor R3. At this time, a low-level signal is inputted to the NAND gate M1 at the initial stage because the voltage induced across the starting coil W3 is low. The NAND gate M1 inverts this low input signal into a high signal to transmit it to the NAND gate M3. By doing so, the oscillation circuit configured of the NAND gates M3 and M4 oscillate. The oscillating signal of the NANG gate M4 turns on/off a transistor TR to interrupt the primary coil of the pick-up coil PC so that a signal voltage capable of triggering the gate of the triac 121 is induced to the secondary coil of the pick-up coil PC, to thereby turn on the triac 121. When the triac 121 is turned on, the starting coil W3 is provided with the AC power through the triac 121 and the starting capacitor SC to start the single-phase induction motor 110.

When the speed of revolution of the motor 110 increases according to the starting operation thereof, the voltage induced across the starting coil W2 is also raised gradually. If this induced voltage reaches a predetermined voltage set by the hysteresis width controlling resistor R3, the level of the signal applied to the NAND gate M1 becomes high so that the NAND gate M1 outputs a low-level signal. This interrupts the oscillation operation of the NAND gates M3 and M4 and triggering of the gate of the triac 121 through the pick-up coil, to thereby turn off the triac 121.

When the triac 121 is turned off, the AC power applied to the starting coil w3 through the starting capacitor SC is cut off, and the induction motor 110 is operated only by the operation coils W1 and W2.

FIG. 2 is a circuit diagram of another voltage-controlled electronic relay for starting the single-phase induction motor. The operation of the circuit of FIG. 2 is similar to that of the circuit shown in FIG. 1, excepting that a resistor R10 and a capacitor C6 are connected in parallel between the gate and cathode of the triac to be connected to the secondary coil of the pick-up coil PC and the output signal of the NAND gate M4 is transmitted to the primary coil grounded through a capacitor C5, to control the triac.

The conventional voltage-controlled electronic relay described above can control the positive feedback characteristic of the NAND gate and the intensity of input signal to widen the hysteresis width up to 75V that is above half the power supply voltage. Accordingly, the starting device can be stably operated even in a power equipment area where voltage variation is severe. In addition, there is no generation of arc and the device can be installed in any place. However, the conventional relay has problems that the voltage applied to the NAND gates M1 to M4 is not stable and the triac may be damaged due to impulse noise.

SUMMARY OF THE INVENTION

It is, therefore, an object of the present invention to provide a voltage-controlled electronic starting relay for a single-phase induction motor, which has a spark killer for removing impulse noise, connected in parallel with a triac, to protect the triac from the impulse noise and provide stabilized voltage to circuit elements of the relay.

To accomplish the object of the present invention, there is provided a voltage-controlled electronic relay for starting a single-phase induction motor, comprising; a power supply unit, configured of a bridge diode, for supplying power to circuit elements of the starting relay when AC power of the induction motor is turned on; a switch for applying the AC power to a starting coil of the induction motor or cutting off the AC power; a sensing element for sensing a voltage induced to the starting coil; a hysteresis unit for outputting an ON control signal at the initial starting stage, generating an OFF control signal for turning off the switch when the induced voltage sensed by the sensing element reaches a predetermined OFF reference voltage, and generating the ON control signal for turning on the switch again when the induced voltage becomes lower than a predetermined ON reference voltage during a normal operation period; and a triggering unit for turning on the switch according to the ON control signal of the hysteresis unit and turning off the switch according to the OFF control signal.

BRIEF DESCRIPTION OF THE DRAWINGS

Further objects and advantages of the invention can be more fully understood from the following detailed description taken in conjunction with the accompanying drawings, in which.

DETAILED DESCRIPTION OF THE PREFERRED EMBODIMENT

The present invention will now be described in connection with preferred embodiments with reference to the accompanying drawings.

Figure 1:
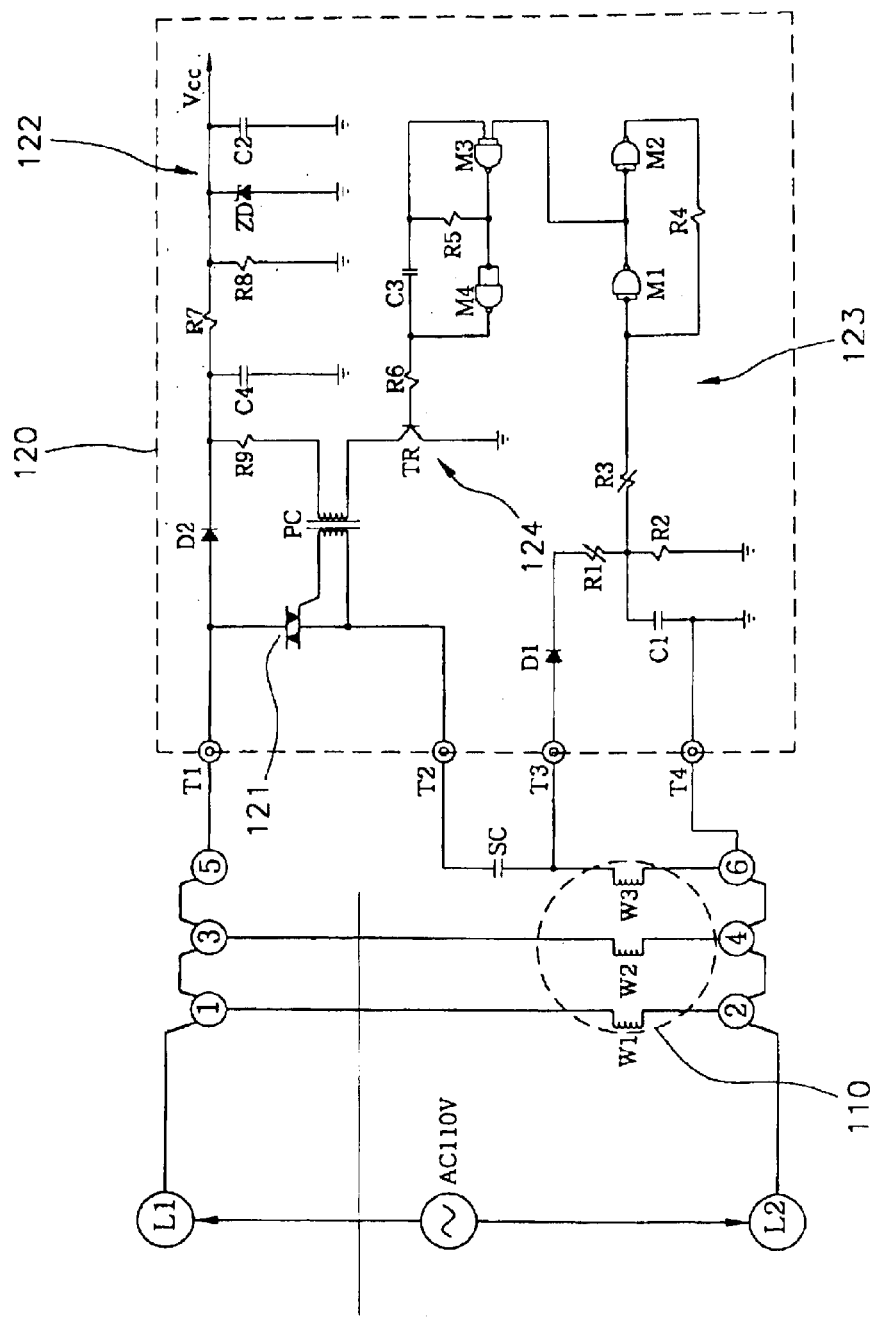
FIG. 1 is a circuit diagram of a conventional voltage-controlled electronic relay for starting a single-phase induction motor.
Figure 2:
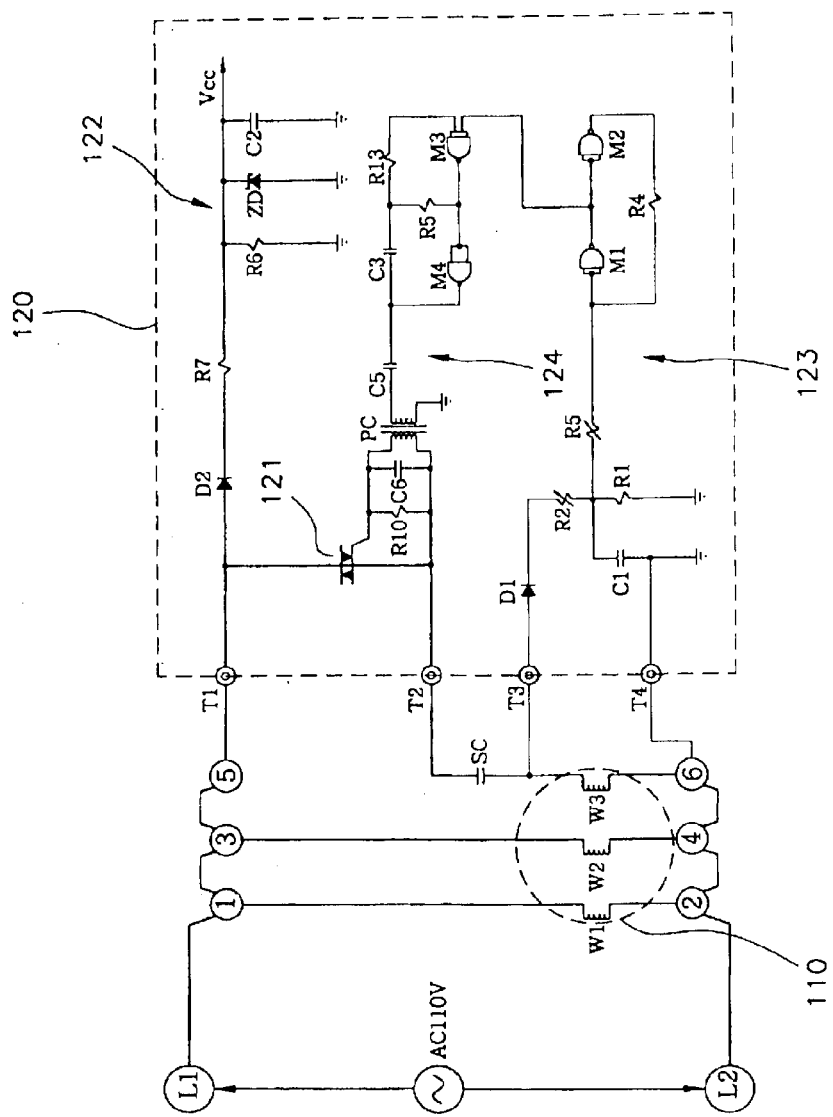
FIG. 2 is a circuit diagram of another conventional voltage-controlled electronic relay for starting a single-phase induction motor.
Figure 3:
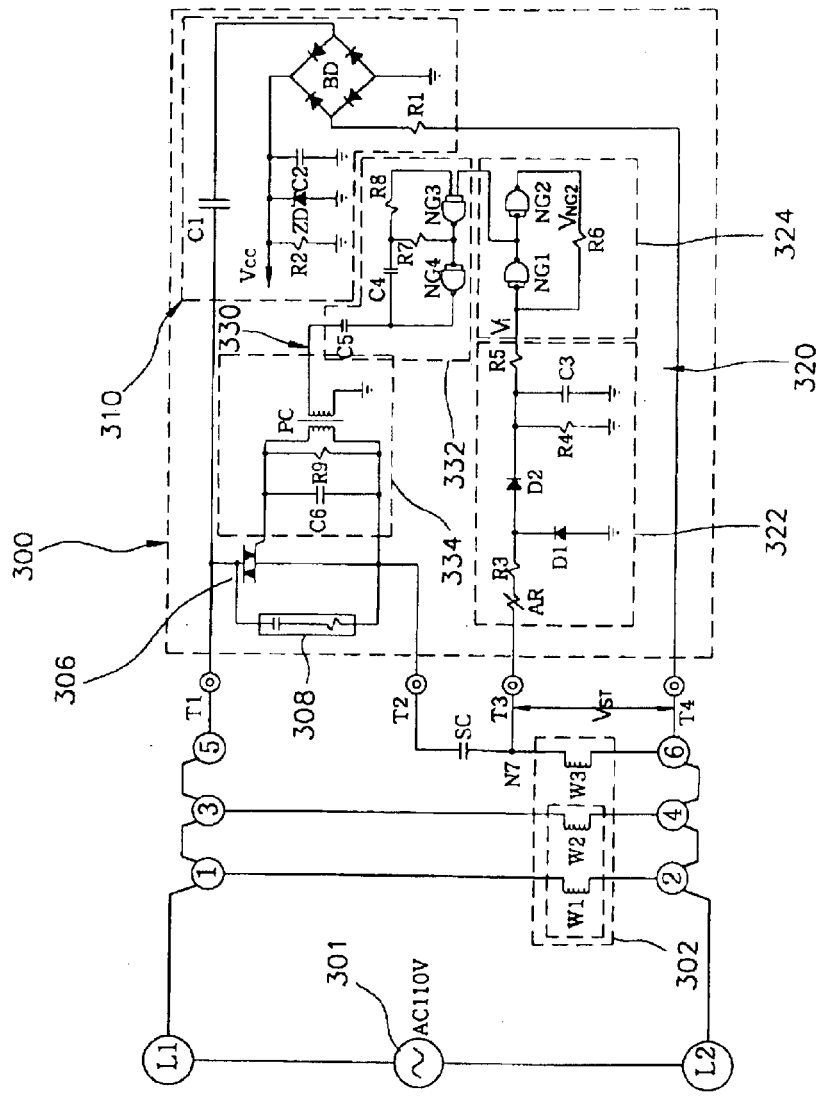
FIG. 3 is a circuit diagram of a voltage-controlled electronic relay for starting a single-phase induction motor according to the present invention.

FIG. 3 is a circuit diagram of a voltage-controlled electronic relay for starting a single-phase induction motor according to the present invention, showing the single-phase induction motor 302 and the electronic relay 300 for turning on/off a starting coil W3 of the motor 302.

Referring to FIG. 3, the induction motor 302 includes operation coils W1 and W2 and the starting coil W3. The operation coils W1 and W2 directly receive commercial AC power 301 through power input ports L1 and L2, and the starting coil W3 is provided with the AC power via a starting capacitor SC and the electronic relay 300.

The electronic relay 300 includes a triac 306 that is a switching element for applying the AC power to the starting coil W3 through the starting capacitor SC, a protection element 308 connected in parallel with the triac 306 to protect it, and a triac control system for triggering the gate of the triac 306. This triac control system is constructed of a power supply unit 310 for providing power to the circuit elements of the electronic relay, a control signal generator 320 for sensing a voltage across the starting coil W3 to generate a control signal for turning on/off the triac, and a triac triggering unit 330 for triggering the gate of the triac 306 according to the output of the control signal generator 320.

The power supply unit 310 consists of a bridge diode BD for rectifying the AC power 301 applied through connection ports T1 and T2, a filter capacitor C2 for filtering the output of the bridge diode BD, a zener diode ZD and a resistor R2, to provide the circuit elements with power voltage Vcc. Here, the AC power 301 is applied to the bridge diode BD through a current-limiting resistor R1 and a capacitor C1, and the filter capacitor C2, zener diode ZD and resistor R2 are connected in parallel with the output port of the bridge diode BD.

The control signal generator 320 includes a signal input unit 322 for sensing the voltage $V_{ST}$ induced across the starting coil W3, and a hysteresis unit 324 for generating an ON/OFF control signal having hysteresis characteristic according to the induced voltage. The signal input unit 322 consists of a hysteresis width controlling resistor AR directly connected to a connection port T3, a resistor R3, a rectifying diode D2, a protection diode D1, a resistor R4, a capacitor C3 and a current-limiting resistor R5. The hysteresis unit 324 consists of two NAND gates NG1 and NG2 serially connected to each other, and a resistor R6 for positive feedback.

The triac triggering unit 330 includes an oscillator 332 oscillating according to the ON/OFF control signal of the hysteresis unit 324, and a gate triggering unit 334 for boosting the oscillating output of the oscillator 332 to trigger the gate of the triac. The oscillator 332 consists of two NAND gates NG3 and NG4, a resistor R8 for feeding back the output of the NAND gate NG3, a capacitor C4 for negatively feeding back the output of the NAND gate NG4, and a resistor R7. The gate triggering unit 334 is constructed of a pick-up coil PC for boosting the oscillating signal received through a capacitor C5 to trigger the gate of the triac 306, a resistor R9 and a capacitor C6 connected in parallel with the secondary coil of the pick-up coil PC.

The operation of the electronic relay according to the invention is explained below in detail.

First, the operation principle of the single-phase induction motor is roughly described. The single-phase induction motor includes the operation coils W1 and W2 and the starting coil W3. The starting coil W3 has starting current flowing therethrough only at the moment when the motor starts to provide starting rotary power to the motor and it becomes OFF state when the motor is in its normal operation state after started. Accordingly, the voltage-controlled electronic relay switches the AC power applied to the starting coil W3 to allow the starting coil to be conductive only when the motor starts and maintains the starting coil in OFF state when the motor is being normally operated.

Upon supply of the AC power for starting the induction motor, the AC power is directly applied to the operation coils W1 and W2 but it is provided to the starting coil W3 through the triac 306 and the starting capacitor SC of the electronic relay 300. Thus, current flows through the starting coil W3 according to ON/OFF state of the triac 306.

When the AC power is applied to the connection ports T1 and T4, it is transmitted to the bridge diode BD through the current-limiting resistor R1 and the capacitor C1 and then full-wave-rectified by the bridge diode BD to become DC power Vcc. The full-wave-rectified DC power voltage Vcc is smoothed by the capacitor C2 and stabilized by the zener diode ZD to be a voltage with a fixed level, to be provided to the circuit elements (NAND gates, for example) of the electronic relay.

The voltage $V_{ST}$ induced to the starting coil W3 according to the revolution of the motor passes through the port T3 and the control resistor AR and is rectified by the diode D2, to be applied to the NAND gate NG1 through the current-limiting resistor R5. Here, the diode D1 connected between the input port of the diode D2 and ground protects the circuit elements from reverse voltage and the capacitor C3 filters the rectified sense signal.

The input voltage Vi applied to the NAND gate NG1 is obtained by the following expression, and it can be adjusted by varying the control resistor AR.

$$V_i = \left(\frac{R4}{AR + R3 + R4} \times V_{ST} \times \frac{1}{2}\right) + V_{NG2}$$

Here, $V_{NG2}$ designates a voltage fed back from the NAND gate NG2 to the NAND gate NG1 through the resistor R6, and $V_{ST}$ means the magnitude of the voltage induced to the starting coil.

Since the voltage $V_{ST}$ induced across both ends of the starting coil W3 at the initial starting stage is close to 0V approximately, the voltage Vi inputted to the NAND gate NG1 is also near to 0V so that it becomes a low-level signal. Accordingly, the NAND gate NG1 outputs a high-level signal.

The high-level signal outputted from the NAND gate NG1 is applied to the NAND gate NG3 of the oscillator 332 to make the oscillator 332 oscillate and, simultaneously, provided to the NAND gate NG2 to be converted into a low-level signal to be positively fed back to the NAND gate NG1 through the resistor R6. Accordingly, the NAND gate NG1 determines its output signal level depending on only the induced voltage $V_{ST}$ because the voltage $V_{NG2}$ in the aforementioned expression, fed back to the NAND gate NG1, has a low level. Here, it is very important to stably maintain the power voltage Vcc of the NAND gates NG1 to NG4 because the high-level and low-level signals of the NAND gates NG1 to NG4 are affected by the voltage Vcc applied to the NAND gates NG1 to NG4.

The oscillating signal generated by the oscillator 332 according to the high-level output signal of the NAND gate NG1 is sent to the primary coil of the pick-up coil PC through the capacitor C5, and then boosted and induced to the secondary coil of the pick-up coil PC, to trigger the gate of the triac 306, thereby turning on the triac 306.

Upon turning on of the triac 306, the AC power is applied to the starting coil W3 via the triac 306 and the starting capacitor SC to start the induction motor 302.

When the speed of revolution of the induction motor 302 increases according to the starting operation thereof, the voltage $V_{ST}$ induced to the starting coil W3 is also raised gradually. If this induced voltage $V_{ST}$ reaches an OFF reference voltage $V_{OFF}$ determined by the hysteresis width controlling resistor R3, the signal Vi inputted to the NAND gate NG1 becomes a high level so that the NAND gate NG1 outputs a low-level signal.

The low-level output signal of the NAND gate NG1 interrupts the oscillation operation in the NAND gates NG3 and NG4 of the oscillator 332. Accordingly, the triggering of the gate of the triac 306 by the pick-up coil PC is stopped, to thereby turn off the triac 306. When the triac 306 is turned off, the AC power applied to the starting coil W3 through the starting capacitor SC is cut off and the induction motor 302 is operated only by the operation coils W1 and W2.

During the normal operation, as described above, the low-level output signal of the NAND gate NG1 is inverted by the NAND gate NG2 to be provided as the high-level feedback voltage $V_{NG2}$ to the NAND gate NG1 through the resistor R6. Accordingly, the voltage $V_{NG2}$ fed back to the NAND gate NG1 becomes the high level in the aforementioned expression so that the NAND gate NG1 determines its output level according to the sum of the sensed induced voltage $V_{ST}$ and the feedback signal $V_{NG2}$. That is, even when the AC input voltage of the induction motor is varied so that the voltage $V_{ST}$ induced to the starting coil W3 is slightly decreased, the high level can be maintained according to the feedback voltage $V_{NG2}$ to result in no occurrence of the starting operation for turning on the starting coil W3. If a heavy load is applied to the motor to reduce the induced voltage $V_{ST}$ to an ON reference voltage $V_{ON}$, the starting operation is carried out again.

Figure 4:
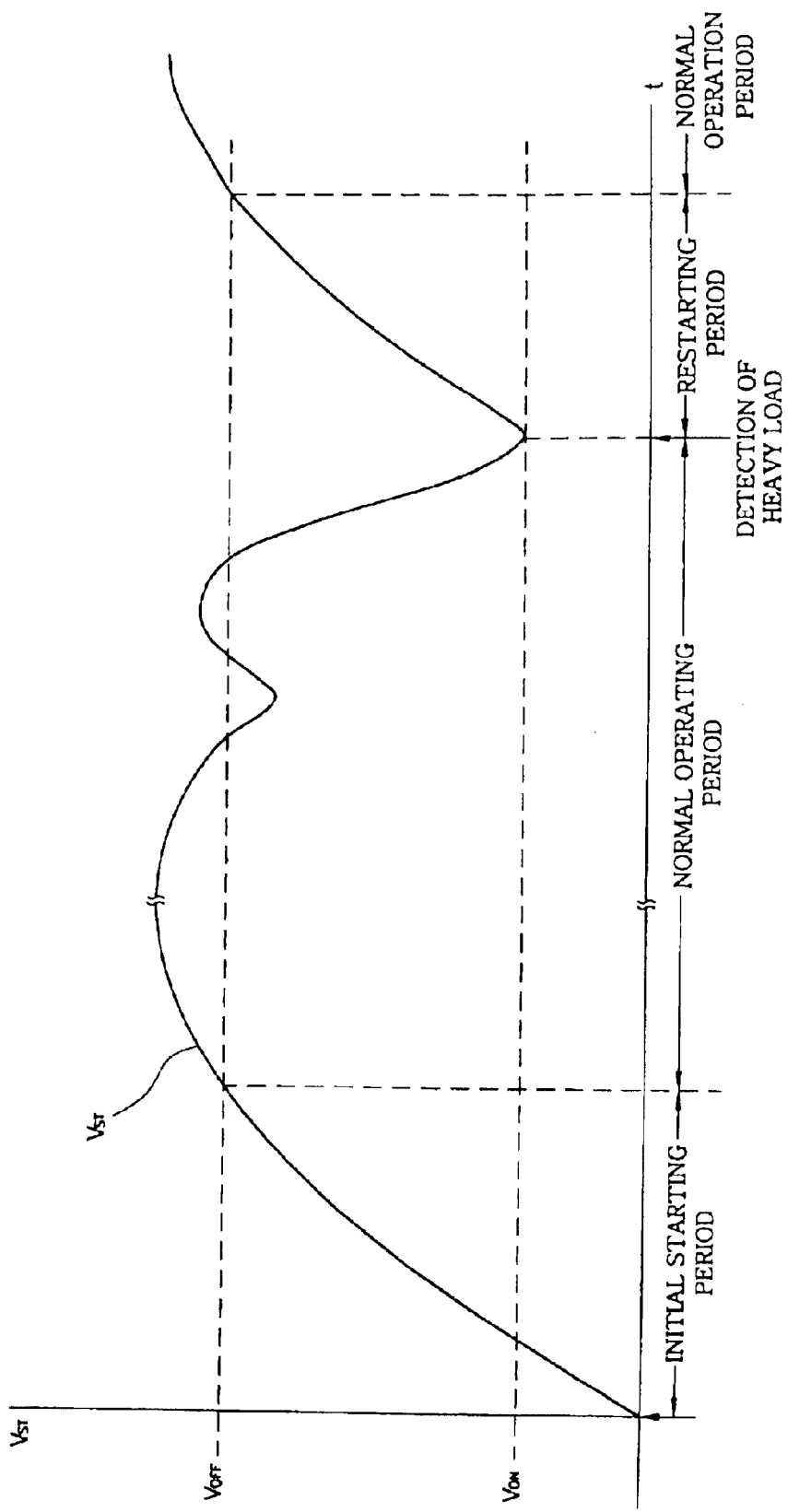
FIG. 4 is a timing chart for explaining the operation of the electronic relay shown in FIG. 3.

The relationship between the induced voltage and the operation of the electronic relay is shown in FIG. 4 and the following table 1.

TABLE 1

| Classi-fication | Output of NG1 | Output of NG2 | Oscil-lator | Triac | Starting coil | Induced voltage($V_{ST}$) |
|---|---|---|---|---|---|---|
| Starting period | High | Low | Oscillation | ON | Conductive(on) | Increase |
| Normal operation period | Low | High | OFF | OFF | OFF | Above $V_{OFF}$ |
| Re-starting period | High | Low | Oscillation | ON | Conductive(on) | Increase from $V_{ON}$ |

In FIG. 4 and Table 1, the horizontal axis is a time axis, which is divided into the initial starting period, normal operation period and restarting period, and the vertical axis indicates the level of the voltage $V_{ST}$ induced to the starting coil W3. In addition, $V_{OFF}$ means the OFF reference voltage for interrupting the starting operation and $V_{ON}$ represents the ON reference voltage for starting the restarting operation after the normal operation.

From FIG. 4 and Table 1, it can be known that the initial starting period begins when the AC power is ON and the induced voltage $V_{ST}$ increases according to the revolution of the motor. During this initial starting period, the NAND gate NG1 outputs the high-level signal and the NAND gate NG2 outputs the low-level signal to positively feed it back to the NAND gate NG1. The oscillator 332 oscillates to output an oscillating signal according to the high-level output of the NAND gate NG1, and the gate triggering unit 334 triggers the gate of the triac 306 to turn on the triac 306. Accordingly, the AC power is applied to the starting coil W3.

When the induced voltage $V_{ST}$ increases to reach the OFF reference voltage $V_{OFF}$, the NAND gate NG1 outputs the low level signal, the NAND gate NG2 output the high-level signal, and the oscillator 332 stops its oscillation, to thereby turn off the triac 306. When the triac 306 is turned off, the AC power applied to the starting coil W3 is cut off. This period during which the starting coil W3 is turned off and the motor runs only by the operation coils W1 and W2 correspond to the normal operation period.

During the normal operation, the motor is continuously operated only by the operation coils W1 and W2 even if the induced voltage $V_{ST}$ is varied and, when an obstacle such as heavy load is generated so that the induced voltage $V_{ST}$ is decreased lower than the ON reference voltage, restarting is carried out. The operation of the restarting period is identical to the operation of the starting period.

In a preferred embodiment of the present invention, in case of the power voltage of 110V, the OFF reference voltage is set to 125V, approximately, that is the voltage induced to the starting coil when the revolution of the motor is accelerated to reach near 70% of the rated speed of the motor, and the ON reference voltage is set to 50V, approximately, falling in the range of 25%~30% of the rated speed. The hysteresis width becomes about 75V in this case.

Meantime, if impulse noise is applied to the triac 306 due to surge input when the triac is turned on/off, a spark killer 308 connected in parallel with the triac 306 absorbs the impulse noise to protect the triac 306 therefrom and the power supply unit 310 continuously supplies the stabilized voltage Vcc to the NAND gates NG1 to NG4 through the bridge diode BD. In addition, the signal input unit 322 stably operates even when the input voltage varies due to the diode D1, and the stabilized voltage applied to the NAND gates NG1 and NG2 results in accurate operation of the electronic relay.

As described above, according to the present invention, the power voltage is stably provided to the circuit elements of the electronic relay using the full-wave-rectifying bridge diode and filter capacitor to accurately control the operation of the relay. Furthermore, the spark killer is connected in parallel with the triac to protect the triac from impulse noise.

Although specific embodiments including the preferred embodiment have been illustrated and described, it will be obvious to those skilled in the art that various modifications may be made without departing from the spirit and scope of the present invention, which is intended to be limited solely by the appended claims.

What is claimed is:

1. A voltage-controlled electronic relay for starting a single-phase induction motor, comprising;
    a power supply unit, configured of a bridge diode, for supplying power to circuit elements of the starting relay when AC power of the induction motor is turned on;
    a switch for applying the AC power to a starting coil of the induction motor or cutting off the AC power;
    a sensing element for sensing a voltage induced to the starting coil;
    a hysteresis unit for outputting an ON control signal at the initial starting stage, generating an OFF control signal for turning off the switch when the induced voltage sensed by the sensing element reaches a predetermined OFF reference voltage, and generating the ON control signal for turning on the switch again when the induced voltage becomes lower than a predetermined ON reference voltage during a normal operation period;
    a triggering unit for turning on the switch according to the ON control signal of the hysteresis unit and turning off the switch according to the OFF control signal; and
    wherein the switch is a triac and a protection element is connected in parallel with the triac to prevent the triac from being destroyed due to impulse noise.

2. The voltage-controlled electronic relay for starting a single-phase induction motor as claimed in claim 1, wherein the protection element is a spark killer.

3. The voltage-controlled electronic relay for starting a single-phase induction motor as claimed in claim 1, wherein the power supply unit includes the bridge diode whose input part is connected to the AC power via a current-limiting resistor R1 and a capacitor C1 and whose output part is connected to a smoothing capacitor C2 and a zener diode ZD.

4. The voltage-controlled electronic relay for starting a single-phase induction motor as claimed in claim 1, wherein the hysteresis unit is constructed of a first NAND gate NG1 connected to invert the input thereof, and a second NAND gate NG2 for inverting the output of the first NAND gate NG1 to positively feed it back to the first NAND gate NG1 through a resistor R6.

5. The voltage-controlled electronic relay for starting a single-phase induction motor as claimed in claim 1, wherein the OFF reference voltage is set to the voltage induced to the starting coil when the speed of the induction motor reaches about 70% of its rated speed and the ON reference voltage is set to the voltage induced to the starting coil when it becomes about 25%~30% of the rated speed.

6. A voltage-controlled electronic relay for starting a single-phase induction motor, comprising;
    a power supply unit, configured of a bridge diode, for supplying power to circuit elements of the starting relay when AC power of the induction motor is turned on;
    a switch for applying the AC power to a starting coil of the induction motor or cutting off the AC power;
    a sensing element for sensing a voltage induced to the starting coil;
    a hysteresis unit for outputting an ON control signal at the initial starting stage, generating an OFF control signal for turning off the switch when the induced voltage sensed by the sensing element reaches a predetermined OFF reference voltage, and generating the ON control signal for turning on the switch again when the induced voltage becomes lower than a predetermined ON reference voltage during a normal operation period; and
    a triggering unit for turning on the switch according to the ON control signal of the hysteresis unit and turning off the switch according to the OFF control signal;
    wherein the switch is a triac and a protection element is connected in parallel with the triac to prevent the triac from being destroyed due to impulse noise, and
    wherein the sensing element is constructed of a distribution resistor for dividing the induced voltage, a diode D2 for rectifying the divided induced voltages, a filter capacitor C3 for filtering the output of the diode D2 and a diode D1 connected between the input port of the diode D2 and ground.

7. A voltage-controlled electronic relay for starting a single-phase induction motor, comprising;
    a power supply unit, configured of a bridge diode whose input part is connected to the AC power via a current-limiting resister R1 and a capacitor C1 and whose output part is connected to a smoothing capacitor C2 and zener diode ZD, for supplying power to circuit elements of the starting relay when AC power of the induction motor is turned on;
    a switch for applying the AC power to a starting coil of the induction motor or cutting off the AC power;

a protection element connected in parallel with the switch to prevent the switch from being destroyed due to impulse noise;

a sensing element, constructed of a distribution resistor for dividing the induced voltage to the starting coil, a diode D2 for rectifying the divided induced voltages, a filter capacitor C3 for filtering the output of the diode D2 and a diode D1 connected between the input port of the diode D2 and ground for sensing a voltage induced to the starting coil;

a hysteresis unit for outputting an ON control signal at the initial starting stage, generating an OFF control signal for turning off the switch when the induced voltage sensed by the sensing element reaches a predetermined OFF reference voltage, and generating the ON control signal for turning on the switch again when the induced voltage becomes lower than a predetermined ON reference voltage during a normal operation period; and a triggering unit for turning on the switch according to the ON control signal of the hysteresis unit and turning off the switch according to the OFF control signal.

8. The voltage-controlled electronic relay for starting a single-phase induction motor as claimed in claim 7, wherein the protection element is a spark killer.

9. The voltage-controlled electronic relay for starting a single-phase induction motor as claimed in claim 7, wherein the hysteresis unit is constructed of a first NAND gate NG1 connected to invert the input thereof, and a second NAND gate NG2 for inverting the output of the first NAND gate NG1 to positively feed it back to the first NAND gate NG1 through a resistor R6.

10. The voltage-controlled electronic relay for starting a single-phase induction motor as claimed in claim 7, wherein the OFF reference voltage is set to the voltage induced to the starting coil when the speed of the induction motor reaches about 70% of its rated speed and the ON reference voltage is set to the voltage induced to the starting coil when it becomes about 25%–30% of the rated speed.

* * * * *